(12) United States Patent
Branning

(10) Patent No.: US 6,485,651 B1
(45) Date of Patent: Nov. 26, 2002

(54) QUICK INVERTING LIQUID FLOCCULANT

(75) Inventor: Merle L. Branning, Plano, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/819,213

(22) Filed: Mar. 28, 2001

(51) Int. Cl.$^7$ .............................. C02F 1/00; B01D 17/04
(52) U.S. Cl. ..................... 210/702; 210/708; 210/723; 366/348; 523/336; 524/922
(58) Field of Search ................................ 210/702, 708, 210/723; 366/348; 523/336; 524/922

(56) References Cited

U.S. PATENT DOCUMENTS

| | | | |
|---|---|---|---|
| 3,624,019 A | 11/1971 | Anderson et al. | |
| 3,734,873 A | 5/1973 | Anderson et al. | |
| 4,051,065 A | 9/1977 | Venema | |
| 4,330,450 A | 5/1982 | Lipowski et al. | |
| 4,392,917 A | 7/1983 | Lipowski et al. | |
| 4,431,548 A | 2/1984 | Lipowski et al. | |
| 4,505,828 A | 3/1985 | Lipowski et al. | |
| 4,552,670 A | 11/1985 | Lipowski et al. | |
| 4,650,827 A | 3/1987 | Becker et al. | |
| 5,006,596 A | 4/1991 | Chen et al. | |
| 5,137,641 A | * 8/1992 | Bhattacharyya | |
| 5,679,740 A | 10/1997 | Heitner | |

* cited by examiner

*Primary Examiner*—Betsey Morrison Hoey
(74) *Attorney, Agent, or Firm*—Kelly L. Cummings; Thomas M. Breininger

(57) ABSTRACT

This invention is directed to methods for quickly inverting and dispersing a flocculant in an aqueous slurry to achieve settlement of solids and clarification of the slurry water. In particular, this invention relates to methods for quickly inverting a flocculant-containing emulsion in-line without significantly destabilizing the emulsion. The methods comprise dosing water with at least one water-in-oil emulsion containing at least one of a flocculent polymer and a hydrophilic surfactant and subjecting the water and emulsion to a high shear, turbulent reverse flow, such that the combination of the surfactant and shear synergistically inverts the emulsion, so the flocculant may be directly injected into the slurry. In an alternative embodiment, the emulsion is fed directly to the slurry to be treated and subjected to high shear, such that the emulsion inverts in situ, releasing the flocculant into the slurry for solids/liquid separation.

28 Claims, 2 Drawing Sheets

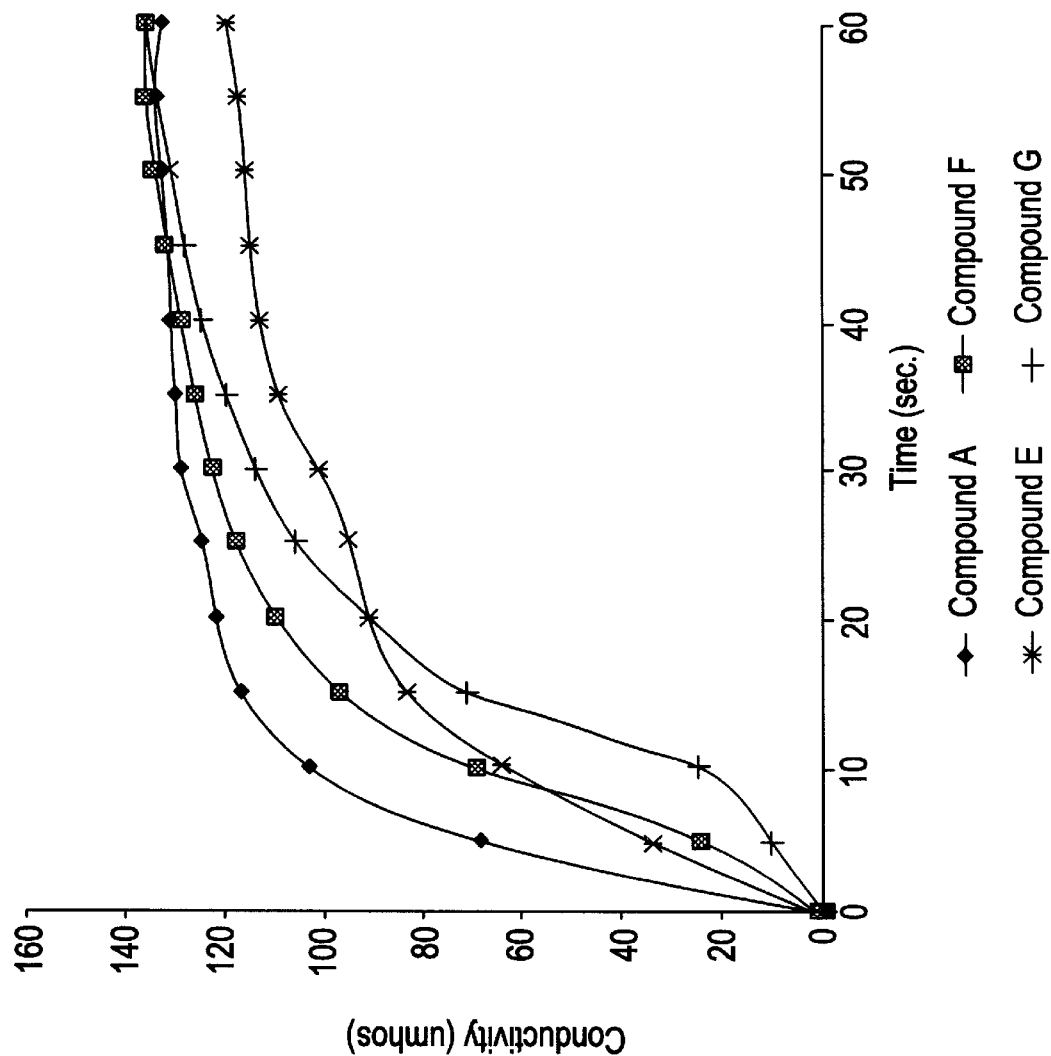

QUICK INVERTING LIQUID FLOCCULANT

FIELD OF THE INVENTION

This invention relates to methods for quickly inverting and dispersing a flocculant in aqueous slurries, such as mineral slurries, to achieve separation of solids from liquid in the slurries. In particular, this invention relates to methods for quickly inverting a liquid flocculant in-line without significantly destabilizing the emulsion that contains the flocculent. The methods employ the synergistic combination of a surfactant present in the flocculant-containing emulsion with high shear provided by, e.g., an in-line mixer, to cause the flocculant to be released for direct addition or injection to a solids and liquid separation application.

The present invention has application in, e.g., mineral and mining processing operations, paper and pulp manufacturing, reclamation processes, waste treatment, and any other suitable application requiring solid-liquid separation.

BACKGROUND OF THE INVENTION

A number of industrial processes, including mining and mineral operations, conventionally rely on flocculants to help separate inorganic and organic solids from slurries so that the processing water may be recycled. Flocculants are generally organic polymers that function by aggregating the solids, either by charge neutralization or bridging mechanisms, so they settle in the slurry, resulting in a layer of settled solids and a clarified liquid, the latter being recyclable to the process. Flocculants are commercially available as water-in-oil emulsions with the flocculant polymers coiled within the water phase.

Before the flocculant can act upon the solids in the slurry, however, the emulsion must undergo inversion—a process wherein the bulk phase of the emulsion is inverted from oil to water and the flocculant polymer is released into an aqueous system where it can exert its flocculant activity. Inversion generally requires adding a surfactant to water and agitating the resulting mixture until the oil phase inverts. Inversion is completed when the polymeric flocculant has been released into the water.

Typically, the inversion process is both labor-intensive and time consuming, as it takes one hour or more to complete using specialized equipment—such as tanks, feeders, and pumps—and manpower to carefully weigh out the components and monitor the process.

U.S. Pat. No. 3,734,873 to Anderson et al. discloses a method for dissolving water-soluble vinyl addition polymers into water more rapidly than the solid form of the polymer. The method comprises preparing a water-in-oil emulsion that includes a surfactant and that inverts within one hour of being subjected to agitation. U.S. Pat. No. 5,679,740 to Heitner teaches the use of carboxylated ethoxylated nonyl phenols and alcohols as mechanically stable inverting agents for emulsion polymers. The Heitner emulsions invert after being "stirred" with a paddle stirrer for at least five minutes. However, neither of these methods attains an almost immediate inversion. Nor do the methods mention usage levels or high shear conditions or direct injection of the polymer to a given application. Nor do these methods eliminate the manpower, time, or equipment required by conventional methods.

Thus, there exists a continued need for a method of quickly inverting and dispersing an emulsified flocculant into a solid-liquid separation application.

SUMMARY OF THE INVENTION

This invention is directed to a method for rapidly and almost immediately inverting a flocculant-containing emulsion by the synergistic use of turbulent flow and a surfactant present in the emulsion.

In its principal aspect, a method is provided for quickly inverting a flocculant-containing emulsion and dispersing the flocculant in a slurry. The method comprises: (a) dosing water with an effective flocculating amount of at least one water-in-oil emulsion comprising at least one flocculant and at least one hydrophilic surfactant, the surfactant being present in the emulsion at a concentration of from about 1 to about 10 percent, by weight; (b) subjecting the water and the emulsion to high shear, comprising a turbulent reverse flow, at a sufficient pressure and for a sufficient time for the at least one emulsion to invert and release the at least one flocculant into the water; and (c) adding the released at least one flocculant to an aqueous slurry for separation of solids from liquid in the slurry.

In its second aspect, the invention is a method for direct injection or addition of a flocculant to a solid-liquid separation application. The method provides for quick inversion of a flocculating-containing emulsion in situ so the flocculant is released directly into the application. The method comprises feeding into an aqueous slurry an effective flocculating amount of at least one water-in-oil emulsion, each emulsion comprising at least one water-soluble organic flocculant polymer and at least one hydrophilic surfactant; and subjecting the slurry and the at least one emulsion to an effective amount of high shear for sufficient time and at sufficient pressure, such that the at least one emulsion inverts in situ and the at least one flocculant is released into the slurry for solids/liquid separation. The flocculant comprises polymers selected from the group consisting of copolymers, homopolymers and terpolymers comprising from 0.01 to 100 mole percent of any vinyl-containing functional monomer such as acrylamide or sodium acrylate, as examples. The polymers have a reduced specific viscosity of from less than 1 to about 50 deciliters per gram or greater.

BRIEF DESCRIPTION OF THE FIGURES

FIG. 2 is a graph illustrating the invertability of flocculent products containing various blends of surfactants.

DETAILED DESCRIPTION OF THE INVENTION

Figure 1:
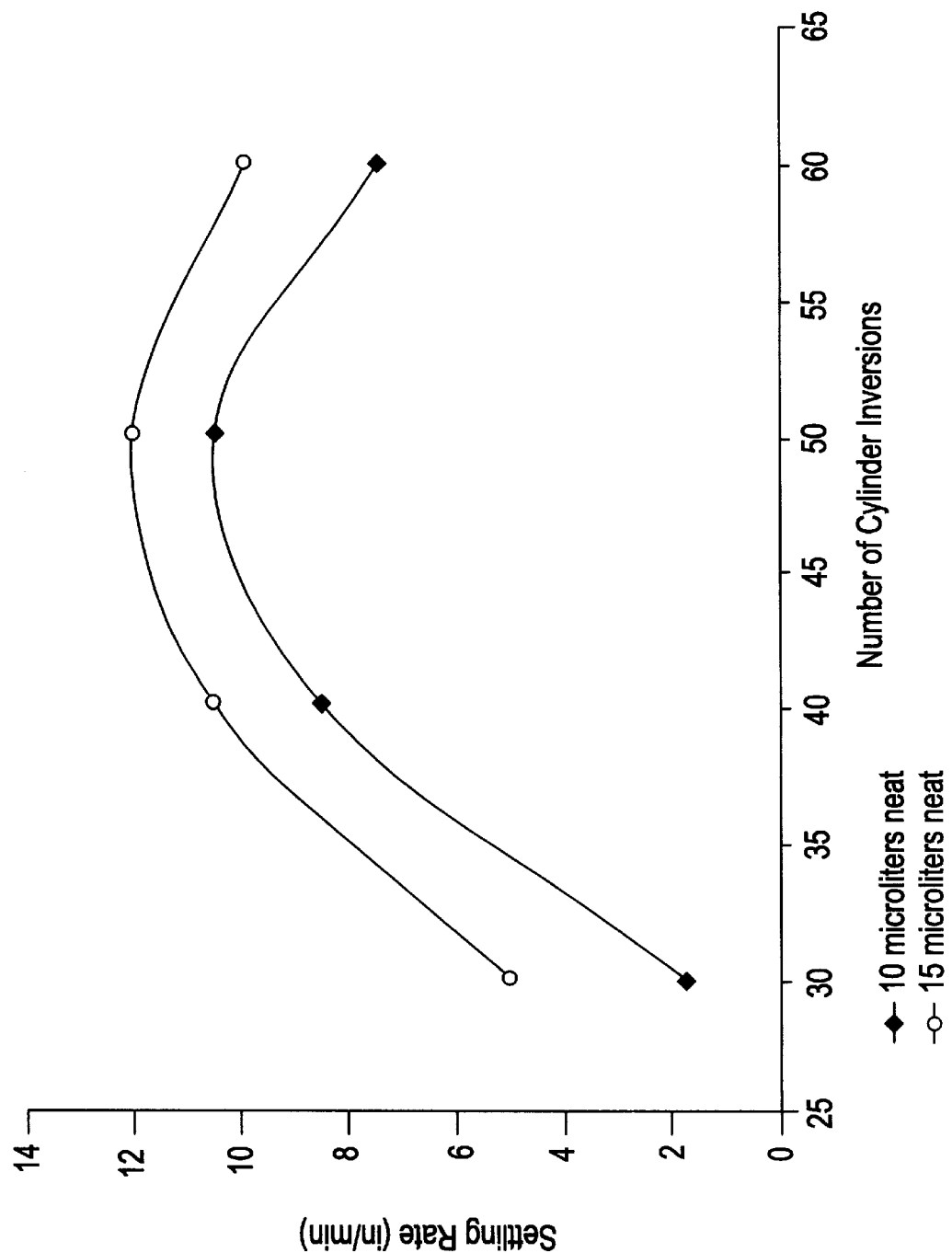
FIG. 1 is a graph illustrating the effect of the amount shear on settling rate of solids in a coal slurry.

For purposes of this patent application, the following terms have the definitions set forth below:

"Aggregate" refers to a mixture of sand and gravel.

"Alkyl" means a fully saturated hydrocarbon radical of from about 1 to about 40 carbon atoms, which may be linear or branched.

"Anionic polymer" means a polymer having a net negative charge, such as a copolymer of acrylamide and sodium acrylate.

"APTAC" means acrylamido propyl trimethyl ammonium chloride.

"Cationic polymer" means a polymer having a net positive charge, such as homopolymers, copolymers, and terpolymers comprising diallyldimethyl ammonium chloride, dimethylaminoethyl/acrylate methyl chloride quaternary ammonium salt, acrylamide, amines, amidoamines, ethyleneimine, EDC/NH$_3$, acrylic acid, acrylate, vinylamine, vinylformamide, vinyl acetate, and vinyl alcohol, as examples.

"DADMAC" refers to diallyldimethyl ammonium chloride.

"DMAEM-MCQ" means dimethylaminoethylmethacrylate methyl chloride quaternary.

"DMAEA-MCQ" means dimethylaminoethylacrylate methyl chloride quaternary.

"EDC/NH$_3$" means a polymer comprising ethylene dichloride and ammonium salt.

"EO" means ethylene oxide.

"HLB" refers to hydrophobic-lipophilic balance.

"Mannich reaction" means a reaction of active methylene compounds with formaldehyde and ammonia or primary or secondary aminos to give beta-aminocarbonyl components.

"MAPTAC" means methacrylamido propyl trimethyl ammonium chloride.

"Mineral slurry" refers to aqueous suspensions of minerals and other particles from mineral and mining operations, where such solids are selected from the group consisting of coal, clean coal, bauxite, iron ore, copper ore, sand, gravel, clay, dirt, lead/zinc, phosphate rock, taconite, beryllium, trona, kaolin, titania, uranium, precious metals, and the like.

"Monomer" means a carbon-based molecule or compound, which has specific functional groups, a simple structure, and relatively low molecular weight, such that it is capable of conversion to polymers by combination with itself or other similar molecules or compounds.

"PO" means propylene oxide.

"Polyacrylate" means the salt neutralized form of polyacrylic acid (salt can be sodium, potassium, etc).

"Polyacrylic acid" means polymers from acrylic acid or hydrolysis of polyacrylamide.

"Polyamines" means polymers containing amine functionality, such as dimethylamine-epichlorohydrin polymers. These polymers can be "crosslinked" with ammonia, or they may be linear.

"Poly(DADMAC)" means polymers from diallyldimethyl ammonium chloride.

"Poly(DMAEM-MCQ)" means a homopolymer of dimethylaminoethylmethacrylate methyl chloride quaternary.

"Poly(DMAEA-MCQ)" means a homopolymer of dimethylaminoethylacrylate methyl chloride quaternary.

"Polyvinylamine" means polymers made from the polymerization of N-vinyl formamide which polymers are then hydrolyzed. This also includes copolymers of vinylamine with monomers such as vinylformamide, vinyl acetate, vinyl alcohol and acrylamide.

"RSV" stands for "Reduced Specific Viscosity." RSV is an indication of polymer chain length and average molecular weight which, in turn, indicate the extent of polymerization. RSV is measured at a given polymer concentration in a standard electrolyte solution and temperature and is calculated as follows:

$$RSV = \frac{[(\eta/\eta_o)] - 1}{c}$$

$\eta$=vicosity of polymer solution, based on flow times (seconds)

$\eta_o$=viscosity of solvent at the same temperature, based on flow times (seconds)

c=concentration of polymer in solution

In this patent application, concentration "c" has units of gram/100 milliliters (g/mL) or gram/deciliter (g/dL), and RSV has units of deciliter/gram (dL/g). RSV was measured at a pH of 8–9 on polymer concentrations of 0.045%, by weight, in 1 M sodium nitrate solution as the solvent. The viscosities $\eta$ and $\eta_o$ were measured using a Cannon Ubbelohde semi-micro viscometer, size 75, with the viscometer mounted in a perfectly vertical position in a constant temperature bath adjusted to 30±0.02 degrees C. The error inherent in the calculation of RSV is about 2 dL/g. A finding that two polymers of the same composition have similar RSV's, measured under identical conditions, indicates that the polymers have similar molecular weights and should, therefore, give the same performance or activity in a given application.

"Surfactant" means any compound that reduces surface tension when dissolved in water or water solutions or that reduces interfacial tension between two liquids, or between a liquid and a solid.

As indicated, in its first aspect, this invention relates to a method for quickly inverting a flocculant-containing emulsion so it readily releases the flocculant for solids separation in slurries. The method comprises dosing water with an effective flocculating amount of at least one water-in-oil emulsion, each emulsion comprising at least one flocculant and at least one hydrophilic surfactant and subjecting the emulsion-containing water to a sufficient amount of shear at sufficient pressure and for a sufficient time for the at least one emulsion to invert and release the at least one flocculant into the water. The released flocculant is then added—e.g., by injection—into an aqueous slurry for separation of solids from the slurry water. The surfactant is water-soluble or water-dispersible.

Conventionally, inversion involves adding to a preparation tank a carefully weighed or metered quantity of water, a surfactant (usually at a concentration of from about 0.5 to about 1.0 weight percent, on an active surfactant basis and by weight of the water), and a sufficient quantity of a water-in-oil flocculant-containing emulsion to yield a final flocculant concentration of less than 0.15 weight percent to about 0.4 weight percent, or greater, on an active polymer basis, by weight of the water. The mixture is agitated for about one hour or longer until the emulsion fully inverts and releases the flocculant into the water. The flocculant solution is then transferred to a dilution tank, usually via gravity, where it is diluted further, by at least ten-fold. The diluted solution is fed—usually through a pipe of from 25 to 500 feet—into a thickener containing an aqueous slurry where the flocculant promotes separation of solids from liquid.

The present invention expedites the inversion process. Under the methods of this invention, the time required for inverting the emulsion is short: generally, ranging from less than 10 to 30 seconds or greater. Typically, in the practice of this invention, the methods achieve inversion in from about 5 to about 60 seconds; preferably from about 10 to about 30 seconds, and most preferably from about 15 to about 25 seconds. Further, under this invention, inversion may be achieved and the flocculant available for use in considerably shorter pipe lengths than needed in conventional methods; e.g., from less than 3 feet to about 20 feet or greater.

The combination of high shear and a surfactant, selected for its suitable chemistry and employed at a suitable concentration, also eliminates the labor intensity and equipment that typify conventional inversion processes. The preparation tank is no longer needed; nor is the dilution tank. Instead, the released flocculant may be injected directly into the slurry feed line.

The flocculants used in this invention are high molecular weight, anionic, water-soluble or dispersible polymers. The flocculant is micellized within the water phase of the emulsion. Within the micelle, the flocculant is coiled but elongates when released into a bulk water phase. Preparation of water-in-oil emulsions suitable for use in this invention is generally known to those skilled in the art.

More than one flocculant and more than one flocculant-containing emulsion may be used in this invention. Both the chemistry and the amount of flocculant needed for a particular application are determined based upon the properties of the slurry such as its nature, the percent solids, the particle size range of the solids, the desired rate of dewatering, settling, pH, and the desired turbidity in the filtrate.

The flocculants in this invention are generally selected from the group consisting of copolymers, homopolymers and terpolymers comprising from 0.01 to 100 mole percent of a vinyl-containing functional monomer. The vinyl-containing functional monomers include, e.g., acrylamide, diallyldimethyl ammonium chloride, acrylic acid and salts thereof, methacrylic acid and salts thereof, dimethylamino-ethylacrylate methyl chloride quaternary, dimethylaminoet-hylmethacrylate methyl chloride quaternary, 2-acrylamido-2-methyl propane sulfonic acid and salts thereof, acrylamido propyl trimethyl ammonium chloride, methacrylamido propyl trimethyl ammonium chloride, and amines prepared by the Mannich reaction. For example, in one embodiment, the flocculant comprises acrylamide and sodium acrylate, present in a mole ratio of from 99:1 to 1:99, preferably from 99:1 to 50:50, and most preferably, from 95:5 to 60:40. In another embodiment, the flocculant is an acrylamide copolymer containing from 10–30 mole percent of 2-acrylamido-2-methyl propane sulfonic acid.

The flocculant may be an anionic, cationic, amphoteric, or non-ionic polymer. Cationic flocculants generally include, but are not limited to, polymers comprising poly (DMAEM.MCQ), poly(DMAEA.MCQ), acrylamide/ DMAEA.MCQ copolymers, acrylamide/DMAEM.MCQ copolymers, acrylamide/APTAC copolymers, acrylamide/ MAPTAC copolymers, acrylamide/DADMAC copolymers, acrylamide/DADMAC/DMAEA.MCQ terpolymers, AcAm/ DMAEA.BCQ/DMAEA.MCQ terpolymers, and copolymers of vinylamine/vinylformamide, as examples. Other examples of cationic functional groups that may be incorporated into cationic flocculants include amines, amidoamines, ethyleneimine, EDC/NH$_3$, vinylamine, vinylformamide, and the like.

Suitable non-ionic flocculants include, but are not limited to, polyacrylamides, polyvinylpyrrolidone and polyvinylformamides, as examples.

As with the above, virtually any suitable anionic flocculant may be used. Examples of anionic flocculants include, but are not limited to, polyacrylic acid, polyacrylates, poly (meth)acrylates, acrylamide/sodium acrylate copolymers, acrylamide/sodium(meth) acrylate copolymers, acrylamide/ acrylamidomethyl propone sulfonic acid copolymers and terpolymers of acrylamide/ acrylamidomethyl propone sulfonic acid/sodium acrylate.

Among the amphoteric flocculants suitable for use in this invention are acrylamide/sodium acrylate/DADMAC and acrylamide/DMAEA.MCQ/sodium acrylate, as examples.

The molecular weight of the flocculant can vary and usually ranges from less than about 250,000 to about 30,000,000, or higher. Preferably, the molecular weight ranges from about 10,000,000 to more than about 20,000,000, and most preferably from about 15,000,000 to about 20,000,000.

In 1 M sodium nitrate, the flocculant has a reduced specific viscosity of from about 1 to about 50 deciliters per gram. The reduced specific viscosity is preferably from 10 to 45 deciliters per gram and most preferably from 30 to 36 deciliters per gram.

The amount of flocculant that is incorporated into the emulsion can be optimized to meet the particular demands of the slurry system. The emulsion typically contains from about 5 to about 70 percent of flocculant, by weight, on an active polymer basis. Preferably, on an active polymer basis, the flocculant accounts for about 15 to about 50 percent, by weight, and most preferably, from about 25 to about 40 percent, by weight of the emulsion.

The surfactant in the flocculant product is necessary for inverting the bulk phase of the product from oil to water. Suitable surfactants may be anionic, cationic, non-ionic, or amphoteric. Care must be used in selecting an appropriate surfactant because some surfactants may destabilize the emulsion. In an alternative embodiment, the emulsified flocculant product may contain at least one surfactant.

Although a variety of surfactants may be used for inversion, the surfactants suitable for this invention are hydrophilic and have HLB's of from less than 10 to 40, or greater. Preferably, the HLB's range from about 10 to about 30. Suitable anionic surfactants include, but are not limited to, Bioterge AS-40, comprising 40 percent olefin sulfonate, available from Stepan Co., Northfield, Ill.; Aerosol GPG comprising 70 percent dioctyl ester of sodium sulfosuccinic acid, available from Cytec Industries, West Paterson, N.J.; and Steol® CS 460 comprising 60 percent sodium lauryl ethoxysulfate, available from Stepan Co., Northfield, Ill., as examples.

Suitable non-ionic surfactants include, e.g., ethoxylated octyl phenol, ethoxylated linear alcohol, block copolymers of ethylene oxide and propylene oxide (hereinafter "EO/PO copolymers"), secondary alcohol ethoxylate, modified phenols, polyoxyethylenated alkylphenols, polyoxyethyl-enated straight-chain alcohols, polyoxyethylenated polyoxypropylene glycols, polyoxyethylenated mercaptans, long-chain carboxylic acid esters, alkanolamides, tertiary acetylenic glycols, polyoxyethylenated silicones, and the like.

These non-ionic surfactants are available commercially or can be readily manufactured using techniques known in the art. One example of a secondary alcohol ethoxylate is Tergitol 15-S-3 from Union Carbide Corp., South Charleston, W. Va., which has an HLB of about 8. One example of a suitable EO/PO copolymer that comprises 100 actives and has an HLB of about 15 is Pluronic L-64 from BASF Corp., Mt. Olive, N.J.

Preferred non-ionic surfactants include, e.g., ethoxylated octyl phenol and linear alcohol ethoxylate. Ethoxylated octyl phenol having an HLB of 12.7, trademarked TRITON X-114, is available from Rohm & Haas, Philadelphia, Pa.; and a linear alcohol ethoxylate, trademarked ALFONIC 1412-7, is available from Condea Vista Chemical, located in Houston, Tex.

Suitable cationic surfactants include, but are not limited to, compounds such as Ethomeen® C/15, an ethoxylated amine comprising 100 percent actives, available from Akzo Nobel Chemicals Inc., Chicago, Ill. and Marlazin T 50/45, a tallow amine polyethylene glycol ether comprising 50 mole percent EO, available from Condea Vista Co., Houston, Tex., as examples.

Several examples of an amphoteric surfactant include but are not limited to Amphoterge® SB, a substituted imidazoline sulfonate, available from Lonza Inc., located in Fair Lawn, N.J.; and Montaric CLV comprising 50 percent actives of disodium cocoamphodiacetate, available from Uniquema (Paterson), Paterson, N.J.

The concentration of surfactant in the emulsion can be adjusted as needed. However, surfactant is typically incorporated into the emulsion at a concentration of from about 1 to about 10 percent, by weight, and preferably from about 2 to about 6 percent, by weight.

Typically, when a surfactant is included in an emulsion, the surfactant is selected to have a density that is substantially close to that of the emulsion matrix so it does not settle out of the emulsion. For example, when the density of an emulsion is within the range of from about 1 to about 1.1 grams per cubic centimeter (g/cc), the surfactant should have a density within that range or, e.g., within the range of from about 1.02 to about 1.06 g/cc.

In the emulsion, the surfactant does not dissolve, otherwise solubilize, or react with the micellized flocculant in the water phase. In fact, it is not until the emulsion is introduced into an aqueous system and subjected to turbulent inverse flow that the surfactant, in synergistic combination with the turbulent flow, causes the emulsion to invert and release the flocculant into the water.

In yet another embodiment, the emulsion may further comprise at least one high terpene content natural oil. Such high terpene content natural oil is generally a pine oil or a citrus peel oil selected from the group consisting of orange oil, lemon oil, grapefruit oil, and lime oil. For example, in one embodiment, the emulsion comprises about 3 percent linear alcohol ethoxylate (trademarked ALFONIC 1412-7) and about 1 percent orange oil (trademarked COLD PRESSED ORANGE OIL), by weight of the emulsion product. As a group, natural oils—and particularly the high terpene natural oils—work synergistically with the surfactant to promote polymer inversion in a given application. In addition, the fruity scent of the high terpene content natural oils confers the perception to the user that the flocculant formulation is more environmentally friendly.

The emulsion may be added to the water by any suitable means, although it is preferably injected or otherwise added directly into the water at a controlled rate, e.g., by an in-line injector.

When the flocculant-containing emulsified product is dosed or added to water, the resulting product solution contains from about 0.01 percent to about 2 percent of the emulsion product, by weight. The amount of surfactant in the product solution ranges from 0.0001 percent to 0.2 percent, by weight.

The dose of flocculant introduced into the water should be an amount effective for achieving aggregation or separation of the solids from the water in the slurry. Typically, the amount of flocculant dosed into the water is in range of from about 0.0025 to about 0.8 percent, on an active polymer basis, by weight of the water.

To exert its flocculant activity, the inverted flocculant is added to the aqueous slurry at a concentration ranging from less than 0.025 to about 40 parts per million, or greater, on an active polymer basis by weight of the slurry. Addition of the released flocculant into the slurry may be by any suitable means, including, e.g., direct injection or direct feeding into the slurry system.

The water containing the emulsion is subjected to high shear of a pressure and for a time sufficient to cause the emulsion to invert. Generally, high shear is provided as the emulsion-containing water is passed through an in-line inverting device or other fluid dynamics mixing device, which may be an in-line static mixer such as Aqua-Shear® Models M300 and M400, as examples, manufactured by Flow Process Technologies, Inc. of Houston, Tex. Other examples of suitable inverting devices include Koflo® mixer units, Model 3/4 40C-4-12-2, manufactured by Koflo Motionless Mixers Corp. of Cary, Ill., and Dynafloccer, internally designed by Nalco Chemical Co. of Naperville, Ill. As such shearing devices are commonly known in the art, further disclosure is not made herein. The diameter and length of the shearing device may be customized for the particular operation. Elements within the device produce a turbulent reverse flow at certain points, which flow has an opposite rotational direction from the laminar flow of the stream through the pipe. The turbulent flow is believed to exert a synergistic effect with the surfactant on inversion of the emulsion.

Here, the term "high shear" means an effective amount of shear, comprising a turbulent reverse flow, needed to invert the product. The amount of shear needed for inversion varies but is generally the shear provided by water pressure in the range of from less than 5 to about 50 psi, or higher, for flow through a pipe having an inner diameter of ¾ inches, as measured on a standard water pressure gauge of water entering the shearing device.

FIG. 1 is a graph of settling rate vs. shear, wherein "shear" is quantified in terms of "number of cylinder inversions" of the vessel containing a flocculant-treated coal slurry. The flocculant product comprised 96.5 weight percent of a flocculent and 3.5 weight percent of the surfactant ethoxylated octyl phenol (trademarked TRITON X-114). The flocculant used was a copolymer, having 30 mole percent sodium acrylate and 70 mole percent acrylamide, micellized within the water phase of latex.

The settling rate graphed in FIG. 1 was determined by a laboratory procedure that began with filling a 1-liter glass graduated mixing cylinder with the slurry. The cylinder, which had masking tape affixed from the open end to the stand, was capped and inverted to suspend the solids. A predetermined dosage of the flocculant product was added to the slurry, and the cylinder was inverted a predetermined number of times, shown on the x-axis, to impart shear to the treated slurry. After the last inversion, the cylinder was returned to an upright position, and the solids were allowed to settle. The position of the solids/liquid interface was monitored as a function of time and marked on the masking tape at 30-second intervals. The settling rate is the time required for the solids to settle, measured until the solids interface slowed down in its descent (hindered settling). A faster settling rate is associated with a more quickly inverted flocculant product.

FIG. 1 shows that the amount of shear applied to a treated slurry affects the inversion and performance of the flocculant-containing product. In particular, FIG. 1 shows that an appropriate amount of shear is needed to quickly invert the flocculant product and obtain fast settling rates. FIG. 1 also shows that excessive shear may reduce the effectiveness of a flocculant, presumably by breaking down the flocs formed. For example, 30 cylinder inversions of a slurry treated with 10 microliters of the flocculant product yielded a settling rate of about 1.8 inches per minutes; and 40 cylinder inversions increased the settling rate by almost five times—i.e., to about 8.5 inches per minute. Fifty cylinder inversions, however, decreased the settling rate.

The properties of the slurry—such as the particle size and concentration of the solids therein—may affect the amount of shear required for inversion. For any application, the optimum amount of shear required may be determined by experimentation by one skilled in the art.

The methods of this invention may be used to invert flocculant-containing emulsions for solid/liquid separation in slurries where the solids are selected from the group consisting of coal, clean coal, bauxite, iron ore, copper ore, sand, gravel, clay, dirt, phosphate rock, lead/zinc, taconite, beryllium, trona, kaolin, titania, uranium, precious metals, and the like. More than one type of solids may be present in the slurry. Typically, the methods are effective in separating solids that are present at a concentration of from about less than 1 to about 70 percent by weight of the slurry and having a particle size of from about less than 1 microns to about 600 microns.

In the second aspect of the invention, a method is provided for quickly inverting a flocculant-containing emulsion in situ so the flocculant is released directly into an application such as a mineral solids/liquids separation, for example. The method comprises: (a) adding to an aqueous slurry an effective flocculating amount of at least one water-in-oil emulsion comprising at least one water-soluble flocculant polymer and at least one hydrophilic surfactant; and (b) subjecting the slurry and the at least one emulsion to high shear for sufficient time and at sufficient pressure, such that the at least one emulsion inverts in situ and the at least one flocculant into the slurry for solids/liquid separation. The solids to be separated from liquid in the slurry are as described above. The term "high shear" is as described above.

In this aspect of the invention, the flocculant is and has the same properties as described above and is used at the same concentration. That is, the flocculant comprises copolymers, homopolymers, or terpolymers having from 0.01 to 100 mole percent of vinyl-containing functional monomers, as described above, and has a reduced specific viscosity of from about 1 to about 50 deciliters per gram. In one embodiment, the flocculant preferably comprises copolymers of acrylamide and sodium acrylate in a mole ratio of from 95:5 to 60:40 and most preferably from about 70:30.

Similarly, the surfactants identified above are useful in this aspect of the invention and at the range of concentrations given. In an alternative embodiment, the emulsion further comprises at least one high terpene content natural oil, which is described above.

The flocculant-containing emulsion may be added to the slurry by any suitable means, such as by direct injection or direct addition including, e.g., in-line addition. Typically, the emulsion is added to a portion of the slurry that is in close proximity to the shear and need not disperse a significant distance from the point of addition before being subjected to shear.

The shearing/inverting devices suitable for use in this aspect of the invention are commonly known in the art and therefore further disclosure is not made here. Such devices include, e.g., those described above such as in-line static mixers, other fluid dynamic mixing devices, and the like.

This aspect of the invention allows the flocculant product to be inverted in solution at the same time the flocculant is used to agglomerate solids in solid/liquid separation applications. The in situ inversion of the flocculant-containing emulsion also allows the flocculant product to be drip fed into high shear applications without the need for a feed pump, if necessary.

The methods of this invention may be used in remote pond clarification where there is little or no electric power available. Other applications where the technology may be introduced into the slurry with high shear include, e.g., belt presses, mud stacking, and paste technology, for example.

Along with the foregoing description, the following examples are presented solely to illustrate the invention and its utility. Neither the foregoing description nor the examples are intended to limit the invention, as many variations will become apparent to those skilled in the art in view thereof.

EXAMPLE 1

Three formulations of an anionic polymer, identified as products A, B, and C, were evaluated on aggregate slurries to determine which is best for in-line injection to a solids/liquid application, using a Dynafloccer unit. The formulations are shown in Table 1 below. Product A is the product evaluated in FIG. 1.

TABLE 1

Formulations of flocculant compounds tested.

| Test products | Composition | RSV | Percentage of compound (wt. %) |
|---|---|---|---|
| A | 30 mole % sodium acrylate and 70 mole % acrylamide in a latex copolymer | 30–36 | 96.5 |
| | ethoxylated octyl phenol[1] | | 3.5 |
| B | 30 mole % sodium acrylate and 70 mole % acrylamide in a latex copolymer (by hydrolysis) | 30–36 | 98.3 |
| | ethoxylated nonylphenol[2] | | 1.7 |
| C | 30 mole % sodium acrylate and 70 mole % acrylamide in a latex copolymer (higher actives) | 30–36 | 98 |
| | linear alcohol ethoxylate[3] | | 2 |
| D | 30 mole % sodium acrylate and 70 mole % acrylamide dry copolymer | 30–36 | 100 |

[1]Trademarked TRITRON X-114
[2]Trademarked TERGITOL NP-C49
[3]Trademarked ALFONIC 1412-7

The results are shown in Table 2A, and settling rates are compared in Table 2B. The data show that product A—the quick inverting/dispersing anionic polymer comprising 30 mole percent sodium acrylate and 70 mole percent acrylamide in a latex copolymer and 3.5 percent ethoxylated octyl phenol—outperformed product B by about 25 percent and product C by about 40 percent when compared at a settling rate of 10 inches/minute. As shown in Table 2A, visually, compound A also gave the best clarified supernatants.

The Dynafloccer unit performed well as an in-line inverting device for these products, when an LMI pump (Model A151-85HV, manufactured by Liquid Metronics Inc., Milton Roy, Ivyland, Pa.) was used for injection of the polymer into a check valve just prior to entering the Dynafloccer unit. The inverted polymer solution coming out of the Dynafloccer unit was fed directly into the slurry feed line. The treated slurry traveled horizontally through a pipe of about 50 feet, 12 inches in diameter, which discharged about 5 feet above the settling pond.

Settling rate was determined, as described below, by filling a 1-liter graduated cylinder at the discharge of the pipe and determining the amount of settling at timed intervals.

Determination of Solids Settling Rate in a Plant

Settling tests using mineral slurries were used to measure the activity of various flocculant test products. For each test, a 1-liter plastic graduated cylinder was filled with the treated slurry. Masking tape was affixed to each cylinder, extending from the opened end to the stand and aligned along the cylinder graduation marks.

The cylinder was placed in an upright position, a timer was started, and the position of the solids interface was monitored as a function of time, with marks being made on the masking tape at 30-second intervals. Marking ended when the rate of descent of the interface slowed down (hindered settling). The settling rate was calculated for each test in inches/minute by doubling the 30-second measurements of settling. The faster the settling rate, the more efficient was the flocculant activity for this application.

Clarity was measured visually and documented in terms of the degree of apparent haziness in the sample.

TABLE 2A

Results of quick inverting flocculation tests conducted with a Dynafloccer unit on aggregate slurry.

| Product[1] | Dose (cc/min) | Settling (in/min) | Supernatant Clarity (visual) |
|---|---|---|---|
| A | 40 | 20 | Clear |
| " | 60 | 30 | " |
| " | 80 | 50 | " |
| " | 25 | 8 | Slightly hazy |
| B | 80 | 50 | Hazy |
| " | 60 | 40 | " |
| " | 40 | 12 | " |
| " | 25 | 8 | " |
| C | 60 | 16 | NA[2] |
| " | 40 | 8 | " |
| " | 40 | 13 | " |
| " | 200 | 26 | Hazy |
| " | 100 | — | " |
| " | 40 | 9 | " |
| " | 60 | 12 | " |
| " | 80 | 20 | " |

[1]Compositions are shown in Table 1
[2]Not available

TABLE 2B

Comparison of settling rates, determined from flocculation tests conducted with Dynafloccer unit on aggregate slurry.
Settling Rates (in/min)

| Dose (cc/min) | A | B | C |
|---|---|---|---|
| 25 | 8 | 8 | |
| 40 | 20 | 12 | 9 |
| 60 | 30 | 40 | 12 |
| 80 | 50 | 50 | 20 |
| 200 | | | 26 |

EXAMPLE 2

Products A, B, and C shown in Table 1 were tested on aggregate slurries using the Aqua-Shear® unit. The results are shown in Table 3.

TABLE 3

Results of quick inverting flocculation tests conducted with an Aqua-Shear ® unit on aggregate slurry.

| Product[1] | Dose (cc/min) | Settling (in/min) | Supernatant Clarity (visual) |
|---|---|---|---|
| A | 60 | 20 | Clear |
| " | 42 | 14 | " |
| " | 25 | 8 | Slightly hazy |
| B | 80 | 15 | Slightly hazy |
| " | 60 | 12 | " |
| " | 40 | 8 | " |
| C | 80 | 14 | Hazy |
| " | 60 | 12 | Slightly hazy |
| " | 40 | 7 | " |

[1]Compositions are shown in Table 1

These data show that the quick inverting/dispersing anionic polymer of product A, comprising 3.5 percent ethoxylated octyl phenol, outperformed both products B and C by about 40 percent when compared at a settling rate of 10 in/min. Visually, product A gave the best supernatant clarities.

In these studies, the Aqua-Shear® unit performed well as an in-line inverting device for the test products. An LMI pump (Model A151-85HV, manufactured by Liquid Metronics Inc., Milton Roy, Ivyland, Pa.) was used for injecting the polymer into a check valve just prior to entering the Aqua-Shear® unit. The inverted polymer solution coming out of the Aqua-Shear® unit was fed directly into the slurry surge tank and mixed with the slurry prior to being fed to the thickener.

Settling rates were determined, as described above, by submersing a 1-liter graduated cylinder into the thickener center well (when turbulence was created periodically by a sump pump) and determining the amount of settling for 30 seconds and then doubling the measurement to convert the measurements to inches per minute.

EXAMPLE 3

Products A, B, and D, compositions shown in Table 1, were also evaluated on two coal slurries using a Koflo® in-line static mixer. The slurry was analyzed for settling rate, using a Clarometer®, manufactured by Ramsey Technology Inc., Minneapolis, Minn. Replacement ratios, designated as "RR", were determined from the data.

The replacement ratio is an indication of polymer efficiency; i.e., how much polymer is needed to obtain a certain performance level, as compared to a control (benchmark). Here, the replacement ratio is a measure of the amount of quick inverting polymer needed, on an equal actives basis, with respect to Product D, the standard polymer in this study. The performance level selected is a Clarometer® reading of 105.

Table 4. Results of quick inversion studies conducted with a Koflo® in-line static mixer on coal slurry.

TABLE 4

Results of quick inversion studies conducted with a Koflo ® in-line static mixer on coal slurry.

| Slurry | Test Flocculant Product[1] | Dosage (cc/min) | RR[2] |
|---|---|---|---|
| 1 | A | 93.6 | 0.5 |
| | B | 93.6 | 0.5 |
| 2 | A | 35.0 | 0.3 |
| | B | 55.0 | 0.5 |

[1]Compositions are shown in Table 1
[2]Replacement ratio with respect to Product D Table 4 shows a comparison of the replacement ratios calculated for products A and B with respect to D, the conventional polymer system, when tested on two coal slurries.

In slurry No. 1, about 50 percent of the anionic flocculant polymer comprising 3.5 percent ethoxylated octyl phenol (i.e., product A) was needed on an active polymer basis compared to product D.

In slurry No. 2, flocculent product A had a replacement ratio of 0.3, also on an active polymer basis. These results indicate that the quick inverting flocculant product A is a significant advancement in demulsification technology because it can be utilized effectively at low dosages, due to dilute make up conditions. The typical latex emulsion polymers or dry polymer products do not offer this advantage.

EXAMPLE 4

Four quick inverting/dispersing flocculant products containing various blends of surfactants, compositions shown in Table 5, were evaluated for their invertability. In all products tested, the flocculant was an anionic polymer having a mole ratio of 70:30 acrylamide to sodium acrylate. The products were tested at 0.25 percent product solutions. Compound A included 3.5 percent, by weight, of ethoxylated octyl phenol as a surfactant, and compound E included 4 percent, by weight, of an ethoxylated linear alcohol. Compounds F and G incorporated ethoxylated linear alcohol as the surfactant and further included orange oil in a 3:1 weight ratio of linear alcohol ethoxylate to orange oil.

TABLE 5

Formulations of flocculant products.

| Compound | Constituents | Composition Concentration (Wt. %) |
|---|---|---|
| A | Polymers of acrylamide and sodium acrylate in a 70:30 mole ratio, in latex | 96.5 |
|   | Ethoxylated octyl phenol[1] | 3.5 |
| E | Polymers of acrylamide and sodium acrylate in a 70:30 mole ratio, in latex | 96.0 |
|   | Linear alcohol ethoxylate[2] | 4.0 |
| F | Polymers of acrylamide and sodium acrylate in a 70:30 mole ratio, in latex | 96.0 |
|   | Linear alcohol ethoxylate and orange oil[3] in a 3:1 weight ratio | 4.0 |
| G | Polymers of acrylamide and sodium acrylate in a 70:30 mole ratio, in latex | 96.5 |
|   | Linear alcohol ethoxylate and orange oil in a 3:1 weight ratio | 3.5 |

[1] Trademarked TRITON X-114
[2] Trademarked ALFONIC 1412-7
[3] Trademarked COLD-PRESSED ORANGE OIL As each flocculant-containing emulsion inverted, it released the polymer into solution where the polymer imparted a negative charge. Conductivity measurements taken of the inverted solution correlate with the extent of inversion undergone by the polymeric flocculant products. A higher conductivity, achieved quickly, denotes a more rapidly inverted flocculant product.

Results are graphed in FIG. 2. As shown, after 30 seconds, flocculant compound A containing 3.5 weight percent ethoxylated octyl phenol exhibited good inversion, followed by compound F containing 3 weight percent ethoxylated linear alcohol and 1 weight percent orange oil. After 1 minute, the flocculant products containing linear alcohol ethoxylate and orange oil in a 3:1 weight ratio (designated as compounds F and G) exhibited the most favorable inversion properties, followed by the ethoxylated octyl phenol-containing product, compound A. Notably, inclusion of orange oil resulted in quicker inversion, compared with the use of only linear alcohol ethoxylate in compound E.

Changes can be made in the composition, operation, and arrangement of the method of the present invention described herein without departing from the concept and scope of the invention as defined in the following claims.

What is claimed is:

1. A method of quickly inverting a flocculant-containing emulsion for solids and liquid separation in aqueous slurries, the method comprising:
   (a) dosing water with an effective flocculating amount of least one water-in-oil water emulsion comprising at least one flocculant, at least one hydrophilic surfactant and at least one high terpene content natural oil, said surfactant being present in the emulsion at a concentration of from about 1 to about 10 percent, by weight;
   (b) subjecting the water and the emulsion-containing water to high shear, comprising a turbulent reverse flow, at a sufficient pressure and for a sufficient time for the at least one emulsion to invert and release the at least one flocculant into the water; and
   (c) adding the released at least one flocculant into an aqueous slurry for separation of solids from water in the slurry.

2. The method of claim 1 wherein the flocculant is a polymer selected from the group consisting of copolymers, homopolymers, and terpolymers comprising from 0.01 to 100 mole percent of a vinyl-containing functional monomer.

3. The method of claim 2 wherein the vinyl-containing functional monomer is selected from the group consisting of acrylamide, diallyldimethyl ammonium chloride, acrylic acid and salts thereof, methacrylic acid and salts thereof, dimethylaminoethylacrylate methyl chloride quaternary, dimethylaminoethylmethacrylate methyl chloride quaternary, 2-acrylamido-2-methyl propane sulfonic acid and salts thereof, acrylamido propyl trimethyl ammonium chloride, methacrylamido propyl trimethyl ammonium chloride, and amines prepared by the Mannich reaction.

4. The method of claim 1 wherein the flocculant has a reduced specific viscosity of from about 1 to about 50 deciliters per gram.

5. The method of claim 1 wherein the flocculant has a molecular weight of from about 250,000 to about 30,000,000.

6. The method of claim 1 wherein the emulsion contains from about 5 to about 70 percent of the flocculant, by weight, on an active polymer basis.

7. The method of claim 1 wherein the surfactant is selected from the group consisting of anionic, cationic, non-ionic, or amphoteric surfactants having an HLB of from about 10 to about 30.

8. The method of claim 1 wherein the surfactant includes at least one surfactant selected from the group consisting of ethoxylated octyl phenol and linear alcohol ethoxylate.

9. The method of claim 8 wherein the surfactant is ethoxylated octyl phenol.

10. The method of claim 1 wherein the flocculant is added to promote separation of solids from water, wherein the solids are selected from the group consisting of coal, clean coal, bauxite, iron ore, copper ore, sand, gravel, clay, dirt, lead/zinc, phosphate rock, taconite, beryllium, trona, kaolin, titania, uranium, and precious metals.

11. The method of claim 1 wherein the high terpene content natural oil is selected from the group consisting of citrus peel oil and pine oil.

12. The method of claim 11 wherein the citrus peel oil is selected from the group consisting of orange oil, lemon oil, grapefruit oil, and lime oil.

13. The method of claim 1 wherein the emulsion is dosed into the water in-line.

14. The method of claim 1 wherein the shear is a turbulent reverse flow produced by an in-line inverting device.

15. A method of rapidly inverting a flocculant-containing emulsion in situ to release the flocculant directly into a solids/liquid separation application comprising:
   (a) adding into an aqueous slurry an effective flocculating amount of at least one water-in-oil emulsion comprising at least one water-soluble flocculant polymer, at least one hydrophilic surfactant and at least one high terpene content natural oil, the flocculant being a polymer selected from the group consisting of copolymers, homopolymers, and terpolymers comprising from 0.01 to 100 mole percent of a vinyl-containing functional monomer and having a reduced specific viscosity of from about 1 to about 50 deciliters per gram; and (b) subjecting the slurry and the at least one emulsion to high shear for sufficient time and at sufficient pressure, such that the at least one emulsion inverts in situ and the at least one flocculant is released into the slurry for solids/liquid separation.

16. The method of claim 15 wherein the solids in the slurry are selected from the group consisting of coal, clean coal, bauxite, iron ore, copper ore, sand, gravel, clay, dirt, lead/zinc, phosphate rock, taconite, beryllium, trona, kaolin, titania, uranium, and precious metals.

17. The method of claim 15 wherein the flocculent is a polymer selected from the group consisting of copolymers, homopolymers, and terpolymers comprising a vinyl-containing functional monomer.

18. The method of claim 17 wherein the vinyl-containing functional monomer is selected from the group consisting of acrylamide, diallyldimethyl ammonium chloride, acrylic acid and salts thereof, methacrylic acid and salts thereof, dimethylaminoethylacrylate methyl chloride quaternary, dimethylaminoethylmethacrylate methyl chloride quaternary, 2-acrylamido-2-methyl propane sulfonic acid and salts thereof, acrylamido propyl trimethyl ammonium chloride, methacrylamido propyl trimethyl ammonium chloride, and amines prepared by the Mannich reaction.

19. The method of claim 15 wherein the emulsion contains from about 5 to about 70 percent of the flocculant, by weight, on an active polymer basis.

20. The method of claim 15 wherein the flocculant has a molecular weight of from about 250,000 to about 30,000,000.

21. The method of claim 15 wherein the surfactant is selected from the group consisting of anionic, cationic, non-ionic, and amphoteric surfactants and has an HLB of from about 10 to about 30.

22. The method of claim 15 wherein the emulsion contains the surfactant at a concentration of from about 1 percent to about 10 percent, by weight.

23. The method of claim 15 wherein the surfactant includes at least one surfactant selected from the group consisting of ethoxylated octyl phenol and linear alcohol ethoxylate.

24. The method of claim 23 wherein the surfactant is ethoxylated octyl phenol.

25. The method of claim 15 wherein the high shear is a turbulent reverse flow produced by an inverting device.

26. The method of claim 15 wherein the high terpene content natural oil is selected from the group consisting of citrus peel oil and pine oil.

27. The method of claim 26 wherein the citrus peel oil is selected from the group consisting of orange oil, lemon oil, grapefruit oil, and lime oil.

28. The method of claim 15 wherein the emulsion is fed in-line to the slurry.

* * * * *